United States Patent [19]

Benedict et al.

[11] Patent Number: 4,733,783

[45] Date of Patent: Mar. 29, 1988

[54] MULTIDIRECTIONAL MATERIAL HANDLING SUPPORT AND SHUTTLE SYSTEMS

[75] Inventors: Charles E. Benedict, Tallahassee, Fla.; Raymond L. Lancaster, Huntsville, Ala.

[73] Assignee: Benedict Engineering Company, Inc., Tallahassee, Fla.

[21] Appl. No.: 843,970

[22] Filed: Mar. 25, 1986

[51] Int. Cl.⁴ .............................................. B66C 19/00
[52] U.S. Cl. .................................. 212/205; 212/271; 105/177; 104/182
[58] Field of Search .............. 180/901, 902, 164, 9.44; 305/8; 104/89, 182; 105/177; 212/149, 153, 159, 160, 205-221, 271; 198/618, 854

[56] References Cited

U.S. PATENT DOCUMENTS

| | | |
|---|---|---|
| 748,328 | 12/1903 | Wilke . |
| 2,932,413 | 4/1960 | Chanut et al. . |
| 3,059,782 | 10/1962 | Baudhuin . |
| 3,285,447 | 11/1966 | Junion . |
| 3,739,894 | 6/1973 | Hinman . |
| 3,786,936 | 1/1974 | Staadt . |
| 3,893,700 | 7/1975 | Dunmyer . |
| 4,018,322 | 4/1977 | Brown et al. . |
| 4,036,345 | 7/1977 | Webb . |
| 4,060,252 | 11/1977 | Mowery . |
| 4,641,757 | 2/1987 | Rosendale .......................... 212/271 |

Primary Examiner—Joseph F. Peters, Jr.
Assistant Examiner—Stephen P. Avila
Attorney, Agent, or Firm—Dowell & Dowell

[57] ABSTRACT

Material handling systems for supporting and transferring articles within defined areas from one location to another in which cooperatively spaced support plates are mounted within the defined areas and carriages or shuttles are movably supported by the plates in a manner such that the carriages may be guided along a network of optional routes along open passageways created between the plates. The carriages may be mechanized or manually maneuverable and may include load lifting and adjusting components which are selectively operated to raise, support, re-orient and lower the articles so that such articles may be transferred and repositioned as desired.

23 Claims, 9 Drawing Figures

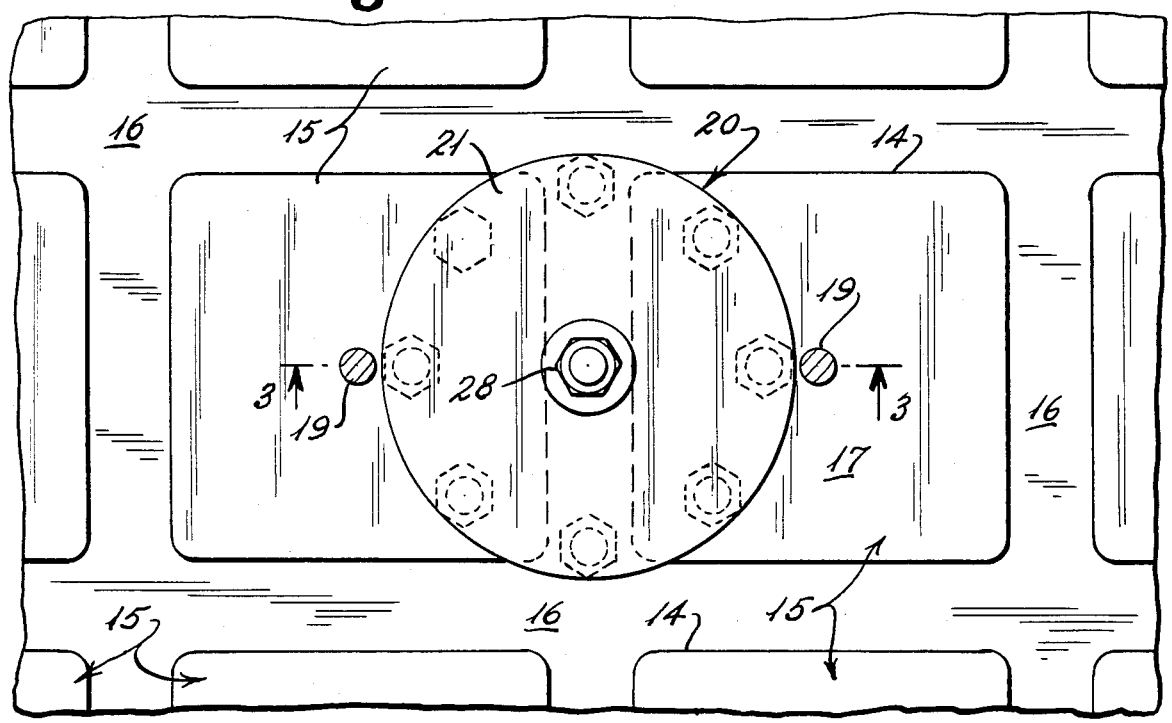
Fig. 2
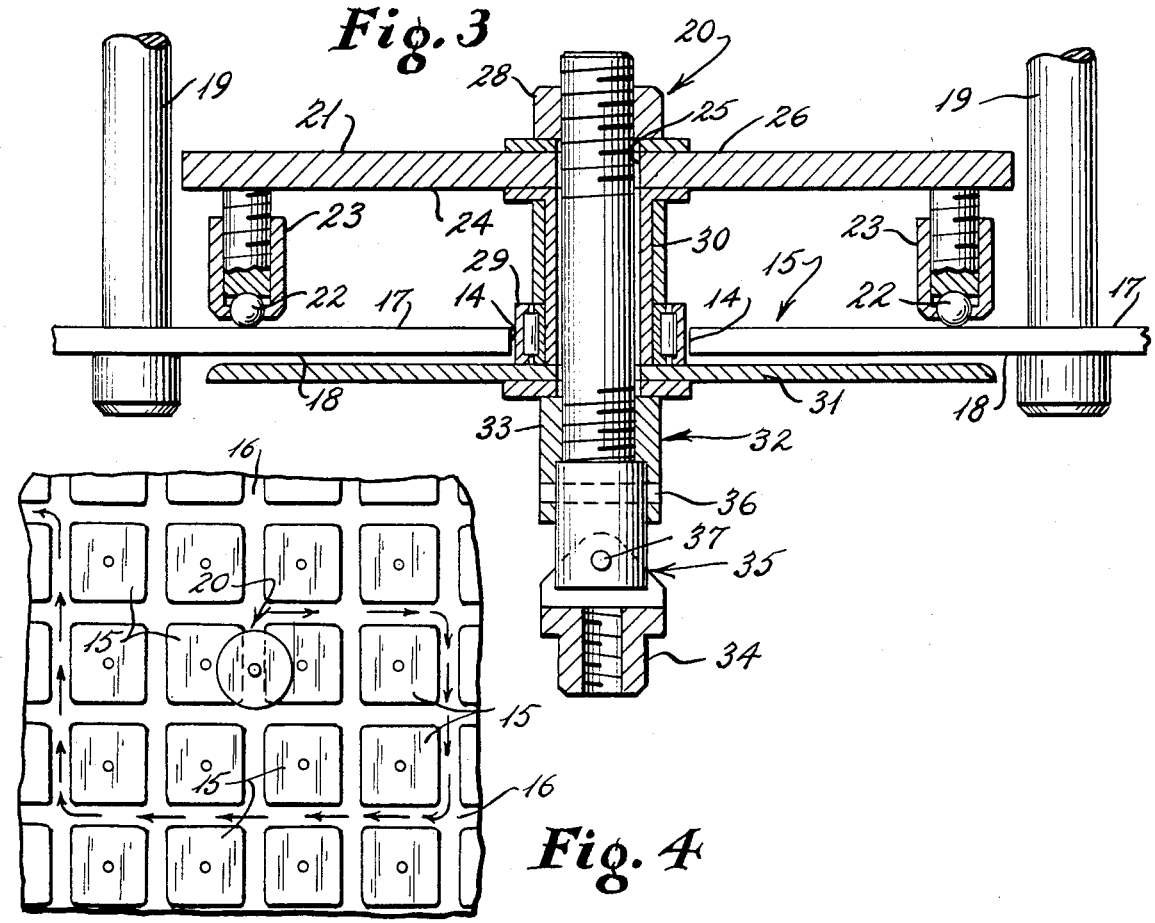
Fig. 3
Fig. 4

MULTIDIRECTIONAL MATERIAL HANDLING SUPPORT AND SHUTTLE SYSTEMS

BACKGROUND OF THE INVENTION

1. Field of the Invention

This invention relates generally to article or material handling and transfer systems for moving articles, equipment or goods from one location to another and relates specifically to material handling systems which include a plurality of plate members which are positioned in spaced relationship with one another so as to create a network of passageways therebetween. The network of passageways will define a plurality of routes between locations thereby insuring that materials may be transferred between locations even though one or more passageways or routes are impassable. Carriages conveying the articles, equipment or goods are selectively moved along the various and optional routes defined by the passageways as they are supported by the plate members so that materials may be transferred or positioned in substantially any desired location within the area defined by the system.

2. History of the Art

Many efforts have been made to create structures, mechanisms and systems for facilitating the movement and/or transfer of materials and articles including crates, machinery, parts, packages and other loads from one place or position to another. Some prior art structures include self-propelled vehicles including mobile lifts or cranes such as disclosed in U.S. Pat. No. 3,059,782 to Baudhuin. Although mobile cranes and lifts of the type shown in Baudhuin may be used to elevate and transfer heavy loads, such structures are large and bulky and are not easily maneuverable and, therefore, are not well suited for many uses.

Other types of material, work or object elevating and transferring mechanisms include fixed rail overhead cranes. Some examples of these structures are disclosed in U.S. Pat. Nos. 2,932,413 to Chanut and 3,786,936 to Staadt. These systems utilize carriages and lifts which are movable along a first direction defined by generally parallel primary support rails suspended from the walls and ceiling of a building. The carriages may also be supported for movement in a second direction by mounting such carriages on secondary support rails which extend perpendicularly with respect to the primary support rails and which themselves are movable along the primary rails. Again, such lift and transfer systems are limited in their usefulness. Such systems do not permit multiple carriages to operate along the same rail system simultaneously or without undue interference and are also further limited in that if a rail or carriage member is damaged or becomes inoperative, the entire system cannot be used.

In addition to the foregoing, other types of crane supports have been designed to provide increased flexibility in the movement of article transfer systems or cranes. In U.S. Pat. No. 748,328 to Wilke, a system is shown wherein rails are positioned in a generally perpendicular grid pattern with turntables being provided at each rail intersection. This structure permits cranes having pivoted wheel assemblies to be transferred from a first pair of tracks or rails to a perpendicular pair of rails. Such turntable mechanisms are awkward and not effectively used as four separate turntables must be rotated before a change in the direction of movement can be achieved.

More recently, warehouses and other facilities have begun using a system of floor oriented open tracks or rails to provide channels for automatically guiding motorized dollies from one location to a preselected destination in the warehouse. The dollies include guidance members which are disposed within or cooperatively engage the tracks or rails in such a manner that they will cause the dollies to follow only preselected paths. As with other prior art material transfer systems, these systems are hampered by the breakdown of any portion or part of the system. Should a dolly stop and block a path or a rail or channel becomes obstructed, the transfer of materials using other dollies is no longer possible.

SUMMARY OF THE INVENTION

The present invention is directed to equipment and guidance systems for supporting, guiding and transferring articles and material from one location to another wherein the equipment may be operated and controlled manually or mechanically. The systems may be used to transfer various loads or articles to substantially any desired location within the area defined or serviced by the systems. Such areas may include workshops, storage or warehouses, wharfs, ships, loading docks, and assembly lines or other places where goods or articles must be conveyed from one place to another.

The invention is embodied in a plurality of support plates which are structurally oriented in a predetermined pattern and in spaced relationship with one another thereby creating a network of intersecting passageways therebetween. The plates are mounted so as to be generally coextensive in a common plane and may be suspended or supported from existing structural elements including ceilings and floors. Shuttles or carriages are provided which ride in contact with the support plates and are guided along the passageways created between the plates. In a first embodiment of the invention, the carriages have a base portion which extends outwardly so as to be generally supported by at least two contiguous plates with a load carrying spindle extending from the base and the passageways.

In a second embodiment of the invention, the carriages have sectionalized or split base portions which are movably supported along at least two spaced points of contact on one or more support plates. Bifurcated load engaging members extend between spaced passageways and join the sections of the base portions of the carriages.

The carriages and support plates combine to create a multidirectional transfer or shuttle system wherein loads or objects may be manually maneuvered or motor controlled. If motor or drive mechanisms are mounted to the carriages, they may be used to cooperatively engage guide mechamisms associated with the support plates to thereby direct the carriages from one support plate to another. The drive mechanisms may be selectively operated by either an attached or remote control.

It is the primary object of the present invention to provide a material handling system for selectively moving or transporting articles or loads utilizing movable carriages which are supported by a plurality of generally planar support members and which are spaced with respect to one another so as to define a plurality or network of open passageways along which the carriages may travel.

It is another object of the present invention to provide a material handling system wherein load carrying or supporting carriages may selectively traverse a plurality of intersecting passageways created by a multitude of spaced carriage support plates in such a manner that a number of carriages can simultaneously operate along the same system and wherein portions of the support system can be replaced or repaired without interrupting carriage movements or operations.

It is also an object of the present invention to provide a material transfer system wherein carriages or shuttles are movable along passageways defined between carriage support plates wherein the direction of travel may be altered by modifying the shape of the support plates and/or carriage members.

It is a further object of the present invention to provide a material handling system wherein articles may be exactly maneuvered from one position to another by carriages which may either be mechanized for self-propulsion or may be manually moved along a system defined by a network of spaced support plates.

It is another object of the present invention to provide material hoist and transfer systems for handling a variety of materials wherein the systems may be installed to or within existing structures by selectively attaching support plates thereto in a patterned and spaced relationship with respect to one another so that a plurality of passageways are defined therebetween and along which load supporting carriages may travel thereby enabling loads to be transferred from a first position or area to a second position or area by a plurality of alternative routes.

BRIEF DESCRIPTION OF THE DRAWINGS

FIG. 2 is a fragmentary top plan view of a portion of the preferred embodiment of the system showing a carriage supported by a pair of support plates.

FIG. 3 is an enlarged cross-sectional view taken along lines 3—3 of FIG. 2.

FIG. 4 is a fragmentary schematic top plan view illustrating one arrangement of the support plates of the system.

DESCRIPTION OF THE PREFERRED EMBODIMENT

Figure 1:
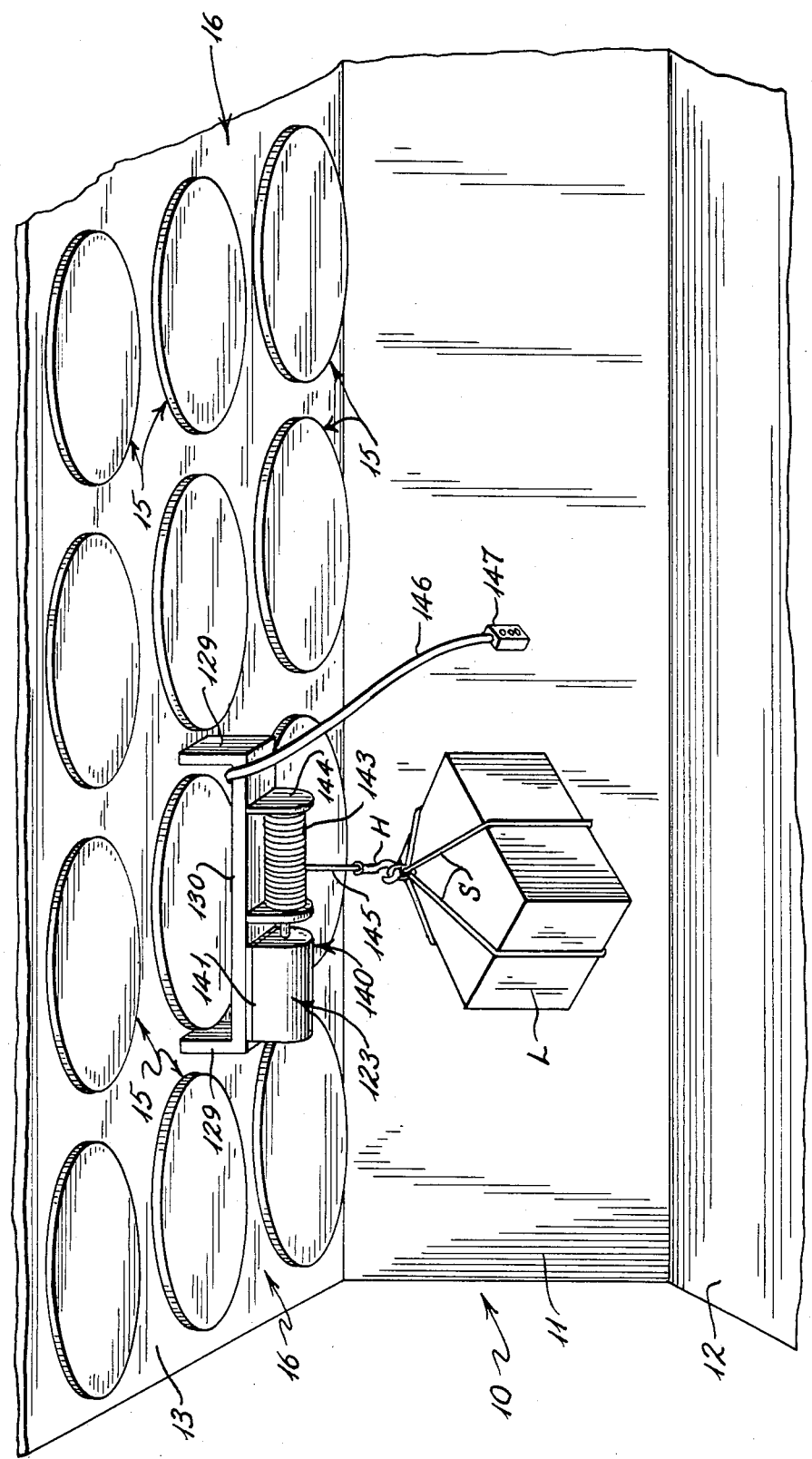
FIG. 1 is a perspective view illustrating one application of the invention.

With reference to the drawings, a room storage area, workshop or other enclosure 10 is provided having side walls 11, a lower surface 12, and an overhead surface 13. It is contemplated that the support and transfer systems of the present invention could extend downwardly from an overhead surface or structure 13 or could extend upwardly from a lower supporting surface; however, the systems will be described hereinafter as depending from an overhead structure which has been reinforced in any desired manner so as to be sufficiently strong to support a concentrated weight.

Figure 8:
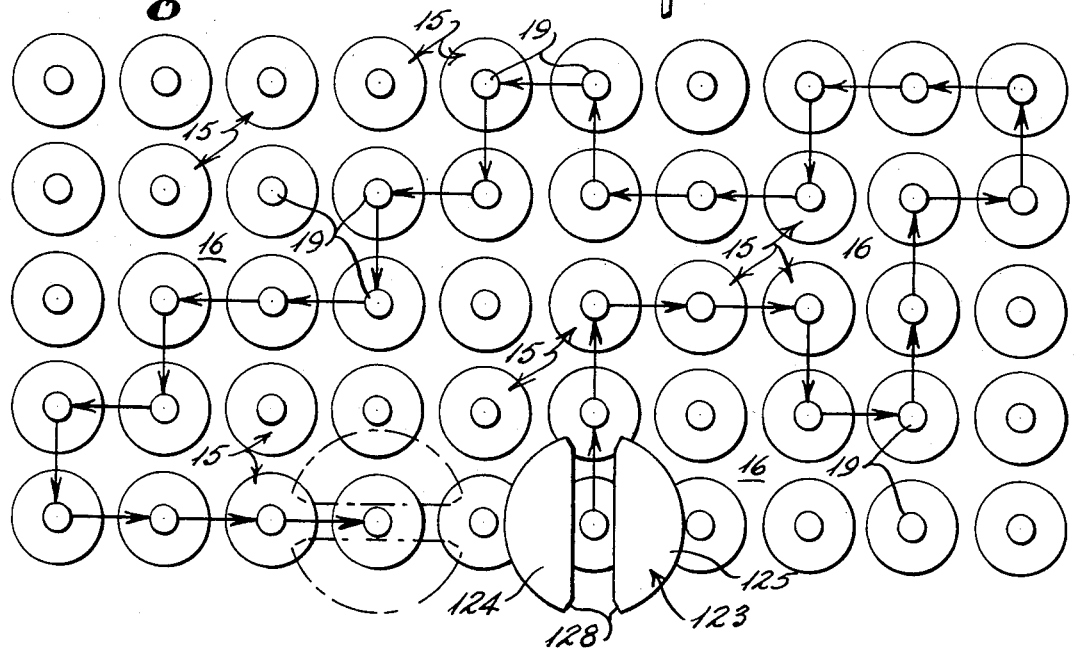
FIG. 8 is a schematic top plan view illustrating an arrangement of the support plate of the system.
Figure 9:
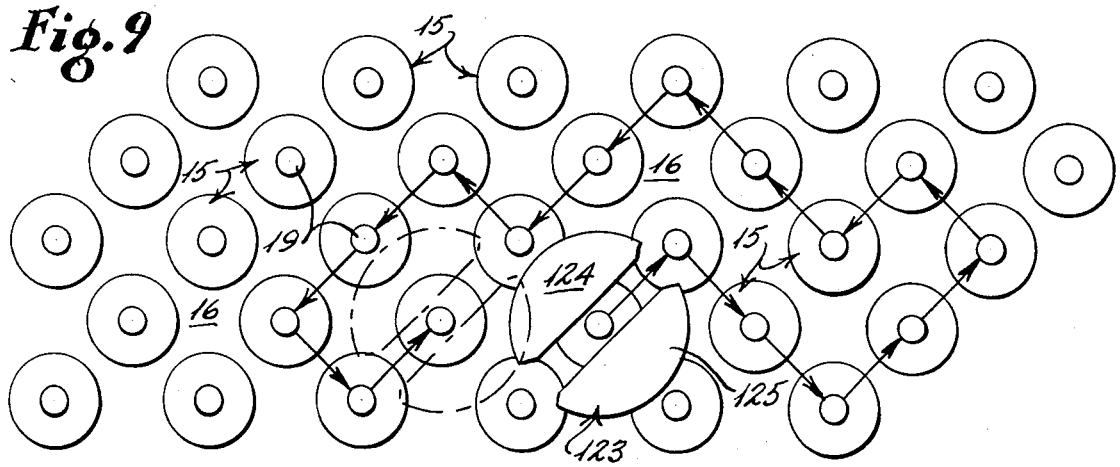
FIG. 9 is a schematic top plan view illustrating another arrangement of the support plates of the system.

The multidirectional transfer system includes a plurality of generally co-planar support members or plates 15. The support plates are shown in FIG. 1 as being generally circular in configuration and in FIG. 2 as being rectilinear in shape. It should be noted that the configuration or shape of the plates may vary and include a variety of shapes and sizes depending upon the appropriate geometric configuration required for each particular system. Each of the support plates 15 includes upper and lower generally flate surfaces 17 and 18, respectively, and side edges 14. The plates 15 are fixed to one end of a spacer or connector 19, the opposite end of which is fixed to the overhead structure 13. The support plates 15 are arranged in a predetermined pattern such as the square pattern shown in FIGS. 8 and 9 or other pattern such as concentric circles, hexagonal patterns or the like. Regardless of the pattern, the centers of the connectors 19 are spaced apart a distance sufficient to provide openings or passageways 16 between contiguous plates for a purpose to be described later.

In the first embodiment of the invention shown in FIGS. 2 and 3, one or more carriages, or shuttles 20 are provided for movement along the line of the passageways 16 created between the support plates 15. Each carriage 20 includes a generally planar base portion 21 which is supported in movable engagement with the upper surfaces 17 of the support plates 15 by at least one contact element 22. The contact elements are shown as consisting of a plurality of roller or ball elements 22. Each of the ball elements 22 is mounted within a housing or bearing socket 23 which is attached to a threaded post 23' which post is welded to the lower surface 24 of the base portion 21. In this regard, other types of contact elements may be used including ball bearings, wheels, castors, low frictional resistance runners, blades or shoes and the like. Alternatively, the contact elements may be formed by pneumatic devices which utilized or create an air cushion to support the carriages 20 in movable relationship to the support plates 15.

As shown in FIG. 2, the base portions 21 of the carriages may be circular although other shapes could also be used. It is important, however, that the diameter or maximum width dimension of the base portion be less than the distance between adjacent connectors 19 of the support members 15. In this manner, the base portions of the carriages will be free to move between the connectors as the carriages travel along the openings or passageways 16 between the support plates 15. Of course, if the connectors are only secured to various spaced support plates 15 with supplemental connections being made between other plates, then the base portions of the carriages may be extended.

In addition to the foregoing, although there are eight ball rollers shown as supporting the carriages 20 with respect to the support plates 15, a different number of rollers or contact elements 22 could be used. It is important to provide sufficient rollers or contact elements to support the anticipated loads which may be transported using the shuttle assemblies or carriages. Further, the rollers, ball or other contact elements should be properly spaced to insure proper contact at all times with the upper surfaces 17 of the plates in order to retain the base portions 21 level and stable. As shown, the roller elements 22 are generally equally spaced at 45° angles with respect to the center of each base portion. This spacing would be adjusted if a base of a different shape were to be used or if a different number of ball or other contact elements were used.

Mounted within a central opening 25 within the base portion 21 of each carriage 20 is a shaft or guidance spindle 26. The spindle extends generally perpendicularly from the base portion and through the open passageways 16 between the support plates. Each spindle is retained within the opening 25 by a washer and lock nut combination or other appropriate fasteners or retainers 28. In order to provide a positive guide contact between the spindles and the edges 14 of the support plates, a sleeve or roller bearing 29 is positioned about each spindle so as to be in the same position or plane as the sides or edges 14 of the support plates 15. The bearings 29 are situated in generally rolling contact with the side edges of the support plates and thereby not only act to positively guide the carriages along the passageways between the plates with little frictional resistance but also prevent any undesirable swaying of the spindles with respect to the base portions of the carriages.

The bearings 29 are retained in position by providing a spacing sleeve 30 which extends between the lower surfaces 24 of the base portion of each carriage to a plane just slightly above the upper surface 17 of the support plates. The other side of each bearing is abutted by a face plate 31 which is also mounted around the spindle 26. The face plate extends outwardly in spaced and generally parallel relationship with respect to both the support plates 15 and the base portions 21 of the carriages. The size of the face plates may vary but the maximum size or dimension should be no greater than the base portions of the carriages for the reasons discussed above. The face plate 31 is secured in position by a lower coupling member 32 which has a thread connector 33. The coupling member 32 also includes a lower socket 34 which is connected through a universal joint 35 having perpendicularly oriented pivots 36 and 37. The connecting member is used to interface the spindle with conventional hooks, hangers, hoists and the like which can be used to engage and/or lift materials to be transferred using the carriages.

In the use of the multidirectional material handling shuttle system of the first embodiment, the carriages 20 may be either manually moved with respect to the support plates 15 or they may be mechanized by providing drive motors on each carriage base that will either function to drive the rollers or other contact elements or will be selectvely engaged with a separate drive such as a chain and sprocket drive system similar to that discussed below with respect to an alternate embodiment of the invention. If the carriages are to be maneuvered, a chain, rope or cable may be attached directly to the lower portion of the spindle 26 or the face plate 31 and suspended downwardly therefrom to a height which is convenient for the operator. Alternatively, if a load is attached to the carriages through the connector or coupling members 32, a line, rope or cable could be attached to the load and thereafter used to pull the carriage along a desired route from a first point to a second point within the area defined by the passageways 16 created by the support plates 15.

As a carriage is moved between the plates, a number of the rollers or other contact elements 22 will momentarily be moved beyond one plate as the carriage approaches adjacent or contiguous plates. In order that the carriage will be supported in a stable position as some of the rollers enter the area above the passageways between the plates, the base portion 21 is made large enough and has a sufficient number of rollers or lengths of contact elements to insure that such elements are at all times engaged with the supporting plates. In the specific configuration, shown a total of at least four rollers, balls or elements would be in contact with a solid support surface at all times.

As previously mentioned, the particular paths or routes which can be created by the use of the spaced plates may be varied depending upon the patterns of the layout. To insure that loads are evenly distributed to structural supports such as ceilings or floors, the pattern created by the placement of the support plates should be as symmetrical as possible. As can be observed, the carriages are free to change direction at each intersection of the passageways between the plates. Because of this, a plurality of carriages may operate within the same support system. Also, sections of the system can easily be avoided or by-passed at will.

Another feature of the present invention is that the carriages or shuttles may be either preprogrammed or appropriately mechanically or electrically guided to follow selected courses. Cams or solenoid operated gates may be placed along the length of the passageways. The cams may be operated by direct contact to abut a portion of the carriage base and thereby guide the carriage with respect to the plates. Alternatively, photodetectors may be used to operate gates which will move to provide an abutment surface which will redirect the carriages in a predetermined direction. These controls will allow the automatic warehousing and/or sorting of articles using the present material handling system.

Figure 5:
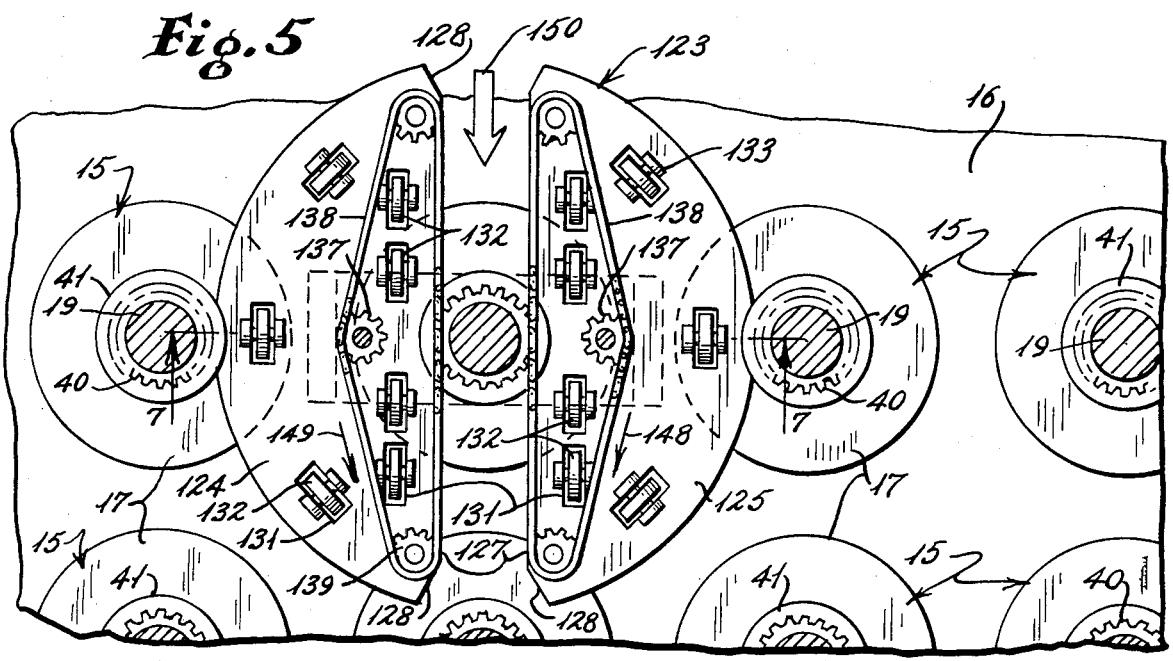
FIG. 5 is a fragmentary top plan view of a portion of a second embodiment showing a carriage moving in a first direction.
Figure 6:
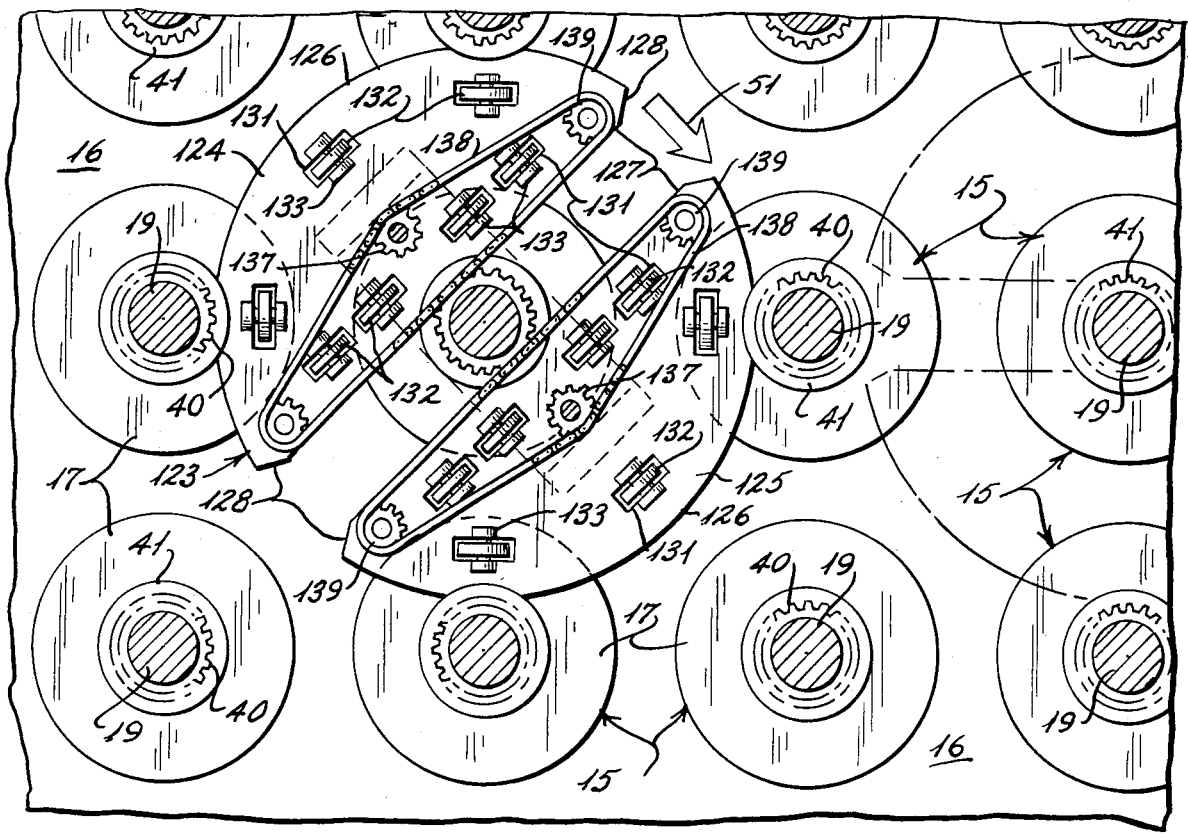
FIG. 6 is a fragmentary top plan view similar to FIG. 5 showing the carriage being rotated to move in another direction.
Figure 7:
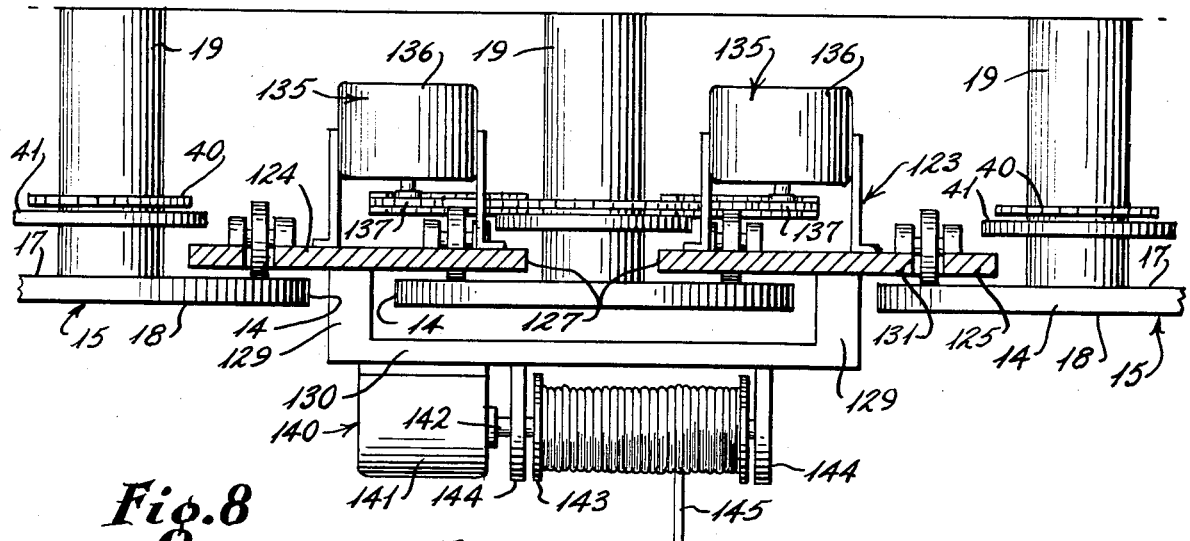
FIG. 7 is an enlarged sectional view taken along the line 7—7 of FIG. 5.

A second embodiment of the invention is shown in FIGS. 5, 6 and 7. In this embodiment, the support members or plates 15 are modified to reflect one form of automated drive for the carriages of the present invention. A sprocket or gear 40 is welded or otherwise attached to each connector 19 and a guide 41 is fixed to the connector between the sprocket 40 and the flat upper surface 17 of the plates. A shuttle or carriage 123 is provided having a pair of flat substantially semi-circular portions or members 124 and 125 located in spaced generally co-planar relationship with each other and with the radial dimension of such members being less than the distance between the connectors 19.

Each of the generally semi-circular carriage members has a substantially radial outer periphery 126 with the peripheries of such members being struck from a common center. Each carriage member also has an inner edge 127 which is in generally parallel relationship with the opposing edges 127 of the other semi-circular carriage member. The edges 127 are spaced apart a distance slightly greater than the diameter of the connectors 19 of the support members 15. The inner edges 127 also terminate in an angled portion 128 at each end which connects the inner edges to the outer peripheries and provides a guide for centering the connectors 19 between the semi-circular members. In other words, the members 124 and 125 resemble a flat disk from which a substantially diametrical section has been removed.

The carriage members 124 and 125 are located between the plates 15 and the structure to which such support members are mounted. In order to connect the carriage members together so that they remain in fixed position relative to each other, each of the carriage members 124 and 125 has a downwardly extending post or extension 129 and such posts are spaced from each other a distance greater than the diameter of the plates 15 so that the carriage 123 may be moved relative thereto. The posts 129 extend downwardly to a position below the plates 15 and are connected together by a bridge section 130.

Each of the carriage members 124 and 125 has a plurality of openings 131 of a size to accomodate rollers, wheels or other contact elements 132 which are mounted to axles carried in bearings 133 on opposite sides of the openings. As shown best in FIGS. 5 and 6, each of the carriage members has a first series of rollers 132 located substantially in parallel relationship with the inner edge 127 and a second series of rollers located substantially in parallel relationship with the outer periphery 126. The rollers 132 are in rolling contact with the upper surfaces 17 of the plates and are arranged in a manner such that at least two rollers of each carriage member are in engagement with the upper surface of at least one plate at all times to support the carriage 123 in a level relationship with respect to the support members. It is to be noted that the support carriages can also be of the type shown in FIG. 3.

In order to move the carriages 123 from one plate to another in a selected direction as well as to change the direction of movement of the carriages, each semi-circular carriage member 124 and 125 is provided with a power plant 135 such as a variable speed reversible electric motor or the like 136. Each power plant has an output shaft on which a drive sprocket 137 is mounted. The drive sprocket 137 engages a drive chain 138 which extends around idler sprockets 139 carried by the carriage members 124 and 125. At least one run of the drive chain 138 extends generally parallel with generally the entire length of the inner edge 127 of the associated carriage member. Such run engages the guides 41 and meshes with the sprockets 40 carried by the connectors 19 of the plates 15. The length of the parallel runs of the chains is greater than the distance between the connectors 19 of the support members so that the sprocket 40 of a second member is engaged by the chains before the sprocket of a first member is released.

A hoist or other lifting mechanism 140 is mounted on each bridge 130 and such hoist includes a power plant 141 such as an electric motor or the like having an output shaft 142 drivingly conected to a winch, pulley, capstan or the like 143. Preferably, the winches 143 are carried by mounting brackets 144 which are fixed to the bridges 130. Elongated chains, cables, or the like 145 are carried by the winches and are adapted to be extended or retracted by operation of the winches. A cord 146 carries a plurality of conductors (not shown) which control the operation of the power plants 135 and 141 and such cord extends from each traveller or carriage to a position convenient to an operator. The cord terminates at a control box 147 having a plurality of switches by means of which an operator controls the operation of the power plants. If desired, a manually operated chain hoist, block and tackle or the like may be mounted on the bridge 130 for lifting and supporting a load.

In the use of this embodiment of the invention, a load L is located within or adjacent to the area serviced by the system defined by the support plates and such load may be mounted on or attached to a sling S. An operator holds the control box 147 and directs the traveller to a position above the load. Operation of the power plant 141 in one direction causes the chain 145 to be extended so that a hook H or other connector carried by the chain may be connected to the sling. When the power plant 145 is wound into the winch 143 and the load is lifted free of its support.

Thereafter, the power plants 135 are energized with one of such power plants rotating its drive chain in a clockwise direction as indicated by the arrow 148 (FIG. 5) and the other power plant rotating its drive chain in a counterclockwise direction as indicated by the arrow 149 to cause the parallel runs of the drive chains 138 to attempt to move in opposite directions. Since the drive chains 139 mesh with at least one fixed sprocket 40, the result is that the traveller or carriage 123 moves relative to the support plates 15 in the direction indicated by the arrow 150 (FIG. 5). As the carriage 123 advances, the pedestal of the next adjacent support member is received between the semi-circular members 124 and 125 and the drive chains 138 of the carriage engage the sprocket of the next adjacent support member in the path of travel before the sprocket of the first support member is released.

When it is desired to change the direction of movement of the carriage, operation of the power plants 135 is interrupted when the connector 19 of one of the support members is positioned substantially centrally of the carriage. In this position, both of the power plants 135 are operated in the same direction, such as clockwise for example, which causes the carriage to rotate about the connector as indicated by the arrow 151 (FIG. 6). When the space between the semi-circular carriage members is aligned with the connector of an adjacent support member and substantially normal to the previous direction of travel, the power plants 135 are again operated in reverse directions to cause the carriage to move along a path which is generally normal to the first path. It is noted that instead of operating both power plants 135 to cause the carriage to rotate about one of the connectors 19, one of such power plants could be deactivated in which case the operation of the other power plant would rotate the carriage.

By selecting a desired path of movement, the operator can transfer the load to substantially any desired position within the area serviced by the system. If desired, two or more carriages 123 may be used simultaneously and each carriage may be directed along a selected path which is independent of the path of any other carriage.

If damage should occur to one of the support members 15, it is relatively simple to repair or replace the damaged member. Additionally, during the time that one of the support members is damaged, the system may continue to operate since the carriages may be directed around the damaged member.

We claim:

1. A multidirectional material handling and transfer apparatus for moving articles from one location to another within an area having a supporting surface comprising a plurality of support plate means which are disposed in spaced patterned relationship with respect to one another, means for securing said support plate means to the supporting surface so as to be in spaced relationship therewith, each of said support plate means having support surfaces and peripheral edge portions, said support surfaces being generally coplanar with respect to one another, a plurality of intersecting open passageways defined between said each of said peripheral edge poritons of contiguous support plate means so that said support plate means are generally surrounded by said open passsageways, said open passageways forming a network of positive guide routes between spaced locations, at least one carriage means movably supported by said suppot plate means, contact elements mounted to said carriage means so as to permit said carriage means to be in movable contact with said support surface of said support plate means, guide means carried by said carriage means for positively guiding said carriage means with respect to said support plate means and said open passageways, and said carriage means including support means for supporting an article thereto for concurrent movement therewith whereby said carriage means may selectively support an article to be transferred and may be moved along a plurality of said guide routes between one location and another as said carriage means is guided with respect to said open passageways.

2. The material handling and transfer apparatus of claim 1 in which said carriage means includes an outwardly extending base portion, said contact elements being mounted to said base portion, at least one contact element being in contact with one of said support plate means at all times.

3. The material handling and transfer apparatus of claim 2 in which at least one pair of said contact elements are in contact with said support plates on opposite sides of said open passageways from one another.

4. The material handling and transfer apparatus of claim 2 in which said contact elements include a plurality of roller means which are in rolling contact with said support surface of at least one of said support plate means.

5. The material handling and transfer apparatus of claim 4 including roller means in contact with at least two contiguous support plate means at all times.

6. The invention of claim 2 in which said support means includes hoist means for raising and lowering an article relative to said carriage means.

7. The material handling and transfer apparatus of claim 2 in which said means for positively guiding said carriage means includes a spindle means mounted to said base portion of said carriage and extending generally perpendicularly therefrom and through said open passageways.

8. The material handling and transfer apparatus of claim 7 including bearing means mounted about said spindle means, means for retaining said bearing means in substantially an abutting contact with said edge portions of contiguous support plate means so that said bearing means is in a movable and guided engagement with said edge portions of said support plate means within said open passageways.

9. The material handling and transfer apparatus of claim 2 in which said means for securing said support plates includes connector means extending between the supporting surface and each of said support plate means, said connector means being located generally centrally of each of said support plate means and being spaced inwardly of said peripheral edge portions of each of said support plate means, and said base portion of said carriage means being of a size to pass between the connector means of any two contiguous support plate means.

10. The material handling and transfer apparatus of claim 9 including engaging means mounted to said connector means for engaging said guide means for positively guiding said carriage means with respect to said support plate means, and said guide means being of a length to extend between two adjacent connector means.

11. The material handling and transfer apparatus of claim 10 in which said guide means includes drive means for moving said guide means relative to said engaging means of said connector means.

12. The invention of claim 11 including remote control means for operating said drive means to move said guide means in either clockwise or counterclockwise directions.

13. A multidirectional material handling and transfer apparatus for moving articles from one location to another within an area comprising a plurality of shaped support plate means which are disposed in spaced patterned relationship with respect to one another, spaced connector means for securing said support plate means in spaced generally linear relationship with respect to one another, each of said support plate means having upper and lower surfaces and edge portions, a plurality of intersecting open passageways formed between said edge portions of said support plate means, said passageways forming a network of alternate routes between the locations in the area, carriage means movably supported by said support plate means including an outwardly extending base portion, contact means carried by said base portion so as to be in relatively movable contact with said upper surface of said support plate means, spindle means carried by said base portion and extending therefrom through said passageways for positively guiding said carriage means with respect to said support plate means along said passageways, article support means carried by said spindle means and extending outwardly so as to be disposed adjacent said lower surface of said support plate means for supporting an article therefrom for concurrent movement with said carriage means whereby said carriage means may selectively support an article to be transferred and may be moved along a plurality of routes between one location and another as said carriage is guided with respect to said passageways.

14. The multidirectional material handling and transfer apparatus of claim 13 in which said contact means includes a plurality of roller means, said roller means being generally equally spaced adjacent the periphery of said base portions of said carriage means.

15. A multidirectional support and transfer system for moving articles between spaced locations within an are a comprising a plurality of support means having first and second sides, said first sides being in substantially co-planar relationship with each other, said support means being mounted in spaced relation to each other thereby defining intersecting open passageways therebetween which generally surround each of said support means, said open passageways forming a network of positive guide routes between spaced locations, carriage means having at least one base portion mounted in facing relationship with said first side of said support means and having at least one outwardly extending portion extending into spaced relationship with the second side of said support means, means mounted to said carriage means for movably engaging said support means, and said carriage means being of such size and configuration as to be movable into any position along said passageways between said support means.

16. The invention of claim 15 including hoist means connected to the outwardly extending portion of said carriage means.

17. The invention of claim 16 including vertically extending connector means for mounting each of said support means in substantially evenly spaced rows, and said base portion of said carriage means including two members having spaced straight edges providing an opening therebetween on the first side of said support means, said outwardly extending portion having a pair of spaced arm portions extending from said two members, and bridge means connecting said arm portions together on the second side of said support means, the opening between said two members providing clearance for said connector means of said support means to pass between said members.

18. The invention of claim 17 in which including each of said connector means has first engaging means on its periphery, said two members of said base portion of said carriage means having second engaging means in engagement with said first engaging means and drive means for moving said second engaging means relative to said first engaging means to thereby control the movement of said carriage means.

19. The invention of claim 17 in which said second engaging means includes endless tooth means arranged on said two members of said base portion of said carriage means on opposite sides of said connector means and providing a space therebetween through which said connector means passes as said carriage means moves relative thereto, whereby said carriage means may move around and beyond a connector means into engagement with the connector means of an adjacent support means.

20. The invention of claim 18 in which said drive means includes a power plant mounted on each of said carriage means and arranged to drive each of said second engaging means, said carriage means being selectively rotatable or longitudinally movable with respect to said support means.

21. The invention of claim 20 including remote control means for operating said power plants to move said second engaging means in either clockwise or counterclockwise directions.

22. The invention of claim 20 in which said first engaging means is a series of fixed sprocket teeth and said second engaging means is a chain engageable with said sprocket teeth.

23. A multidirectional support and transfer system comprising a plurality of spaced support members arranged in equally spaced rows which form a network of intersecting passageways therebetween, said passageways generally surrounding each of said support members, each of said support members including plate means having at least one generally flat side which is substantially co-planar with adjacent plate means, connector means joined to each of said plate means for supporting said plate means from a structural base, a carriage carried by at least two of said plate means, said carriage having a base portion located in facing relationship with said flat sides of said plate means, means supporting said carriage on said plate means so that said carriage may move relative to said support members, means for selectively driving said carriage, and hoist means on said carriage for positioning a load, whereby said means for selectively driving said carriage may be operated to move said carriage from one support member to contiguous support members along a predetermined route defined along said passageways.

* * * * *

UNITED STATES PATENT AND TRADEMARK OFFICE
CERTIFICATE OF CORRECTION

PATENT NO. : 4,733,783

DATED : March 29, 1988

INVENTOR(S) : Charles E. Benedict et al.

It is certified that error appears in the above-identified patent and that said Letters Patent is hereby corrected as shown below:

Title page:

At (75) Inventors: insert the name of co-inventor C. Joseph Goeke, Tallahassee, Fla.

Signed and Sealed this

Twelfth Day of July, 1988

Attest:

DONALD J. QUIGG

Attesting Officer

Commissioner of Patents and Trademarks